US008234633B2

(12) United States Patent
Schneider et al.

(10) Patent No.: US 8,234,633 B2
(45) Date of Patent: Jul. 31, 2012

(54) INCIDENT SIMULATION SUPPORT ENVIRONMENT AND BUSINESS OBJECTS ASSOCIATED WITH THE INCIDENT

(75) Inventors: Thomas Schneider, Heidelberg (DE); Juergen Sattler, Wiesloch (DE); Tilmann Haeberle, Wiesloch (DE)

(73) Assignee: SAP AG, Walldorf (DE)

( * ) Notice: Subject to any disclaimer, the term of this patent is extended or adjusted under 35 U.S.C. 154(b) by 1080 days.

(21) Appl. No.: 11/971,409

(22) Filed: Jan. 9, 2008

(65) Prior Publication Data
US 2009/0177926 A1    Jul. 9, 2009

(51) Int. Cl.
G06F 9/45    (2006.01)
G06F 9/44    (2006.01)

(52) U.S. Cl. .................... 717/135; 717/127; 717/129

(58) Field of Classification Search .......... 717/120–138; 707/609
See application file for complete search history.

(56) References Cited

U.S. PATENT DOCUMENTS

| 5,867,712 | A | | 2/1999 | Shaw et al. |
| 5,978,584 | A | * | 11/1999 | Nishibata et al. ............. 717/134 |
| 6,177,932 | B1 | | 1/2001 | Galdes et al. |
| 6,292,830 | B1 | | 9/2001 | Taylor et al. |
| 6,363,488 | B1 | | 3/2002 | Ginter et al. |
| 6,389,402 | B1 | | 5/2002 | Ginter et al. |
| 6,553,563 | B2 | * | 4/2003 | Ambrose et al. ............. 717/116 |
| 6,615,253 | B1 | | 9/2003 | Bowman-Amuah |
| 6,636,242 | B2 | | 10/2003 | Bowman-Amuah |
| 6,748,583 | B2 | * | 6/2004 | Aizenbud-Reshef et al. 717/127 |
| 6,804,814 | B1 | * | 10/2004 | Ayers et al. .................... 717/135 |
| 6,817,010 | B2 | | 11/2004 | Aizenbud-Reshef et al. |
| 6,907,546 | B1 | * | 6/2005 | Haswell et al. ............ 714/38.11 |
| 6,918,108 | B2 | * | 7/2005 | Rajaram ....................... 717/126 |
| 7,243,059 | B2 | * | 7/2007 | Crowell ........................... 703/22 |
| 7,266,476 | B2 | * | 9/2007 | Coburn et al. ................ 702/183 |
| 7,302,677 | B2 | * | 11/2007 | Reissman et al. ............ 717/135 |
| 7,428,727 | B2 | * | 9/2008 | Alverson et al. ............. 717/134 |
| 7,519,960 | B2 | * | 4/2009 | Mei et al. ...................... 717/129 |
| 7,543,276 | B2 | * | 6/2009 | Pfander et al. ................ 717/125 |
| 7,543,279 | B2 | * | 6/2009 | Ayers et al. .................... 717/135 |
| 7,584,294 | B2 | | 9/2009 | Plamondon |
| 7,607,124 | B2 | * | 10/2009 | Gooty et al. .................. 717/129 |
| 7,620,940 | B2 | * | 11/2009 | Goldsmith et al. ........... 717/127 |
| 7,689,558 | B2 | * | 3/2010 | Rossmann .................... 717/130 |
| 7,774,172 | B1 | | 8/2010 | Yunt et al. |

(Continued)

OTHER PUBLICATIONS

Duc et al, "Uniform object modeling methodology and reuse of real time system using UML", ACM EMSOFT, pp. 44-47, 2005.*

(Continued)

*Primary Examiner* — Anil Khatri
(74) *Attorney, Agent, or Firm* — Fish & Richardson P.C.

(57) ABSTRACT

This disclosure describes software for supporting an application. In one aspect, software for supporting a business application receives error and dynamic context information from a remote business application in response to an incident. The dynamic context information at least partially identifies one or more business objects (BOs) associated with the incident. The software is further operable to clone at least one of the BOs associated with the incident. The software can then start a transaction simulating the incident. Conversely, the business application (or other supported software) can transmit error and dynamic context information to support software related to an incident within having a particular execution environment. In response to an automated request from the support software executing a simulated transaction simulating the incident, the supported software communicates a clone of one of the associated BOs to the support software. Alternatively, the software re-directs service calls instead of cloning BOs.

19 Claims, 6 Drawing Sheets

U.S. PATENT DOCUMENTS

| | | | |
|---|---|---|---|
| 7,797,686 B2 * | 9/2010 | Agarwala et al. | 717/128 |
| 7,869,425 B2 | 1/2011 | Elliott et al. | |
| 7,904,889 B2 * | 3/2011 | Avitzur et al. | 717/128 |
| 7,930,683 B2 * | 4/2011 | Li | 717/124 |
| 7,958,486 B2 * | 6/2011 | Tsyganskiy et al. | 717/105 |
| 8,037,454 B2 * | 10/2011 | Bates et al. | 717/124 |
| 8,055,612 B2 * | 11/2011 | Barnett | 707/609 |
| 8,079,022 B2 * | 12/2011 | Seneski et al. | 717/135 |
| 8,087,007 B2 * | 12/2011 | Duneau | 717/135 |
| 8,127,277 B2 * | 2/2012 | Albot et al. | 717/127 |
| 2002/0120918 A1 | 8/2002 | Aizenbud-Reshef et al. | |
| 2003/0229884 A1 | 12/2003 | Carr et al. | |
| 2005/0033626 A1 | 2/2005 | Kruse et al. | |
| 2005/0033631 A1 | 2/2005 | Wefers et al. | |
| 2005/0288987 A1 | 12/2005 | Sattler et al. | |
| 2006/0010025 A1 | 1/2006 | Sattler et al. | |
| 2006/0010051 A1 | 1/2006 | Sattler et al. | |
| 2006/0015376 A1 | 1/2006 | Sattler et al. | |
| 2006/0015859 A1 | 1/2006 | Sattler et al. | |
| 2006/0026166 A1 | 2/2006 | Sattler et al. | |
| 2006/0031775 A1 | 2/2006 | Sattler et al. | |
| 2006/0112106 A1 | 5/2006 | Wolf et al. | |
| 2006/0143034 A1 | 6/2006 | Rothermel et al. | |
| 2006/0161505 A1 | 7/2006 | Sattler et al. | |
| 2006/0229890 A1 | 10/2006 | Sattler et al. | |
| 2006/0259272 A1 | 11/2006 | Sattler et al. | |
| 2007/0136342 A1 | 6/2007 | Singhai et al. | |
| 2007/0245409 A1 | 10/2007 | Harris et al. | |
| 2007/0288885 A1 | 12/2007 | Brunei et al. | |
| 2008/0127120 A1 | 5/2008 | Kosche et al. | |
| 2008/0127200 A1 | 5/2008 | Richards et al. | |
| 2009/0147010 A1 | 6/2009 | Russell et al. | |

OTHER PUBLICATIONS

Chen et al, "Algorithms for HLA based distributed simulation cloning", ACM Trans on Modeling and Comput. Simulation, vol. 15, No. 4, pp. 316-345, 2005.*

Canfora et al, "New frontiers of reverse engineering", IEEE FOSE, pp. 1-16, 2007.*

Kawachiya et al, "Clonable JVM a new approach to start isolated Java applications faster", ACM VEE, pp. 1-11, 2007.*

Miki et al., "Development of a Hybrid Type Assessment Method for Power System Dynamic Reliability," IEEE, Oct. 5, 1999, 6 pages.

* cited by examiner

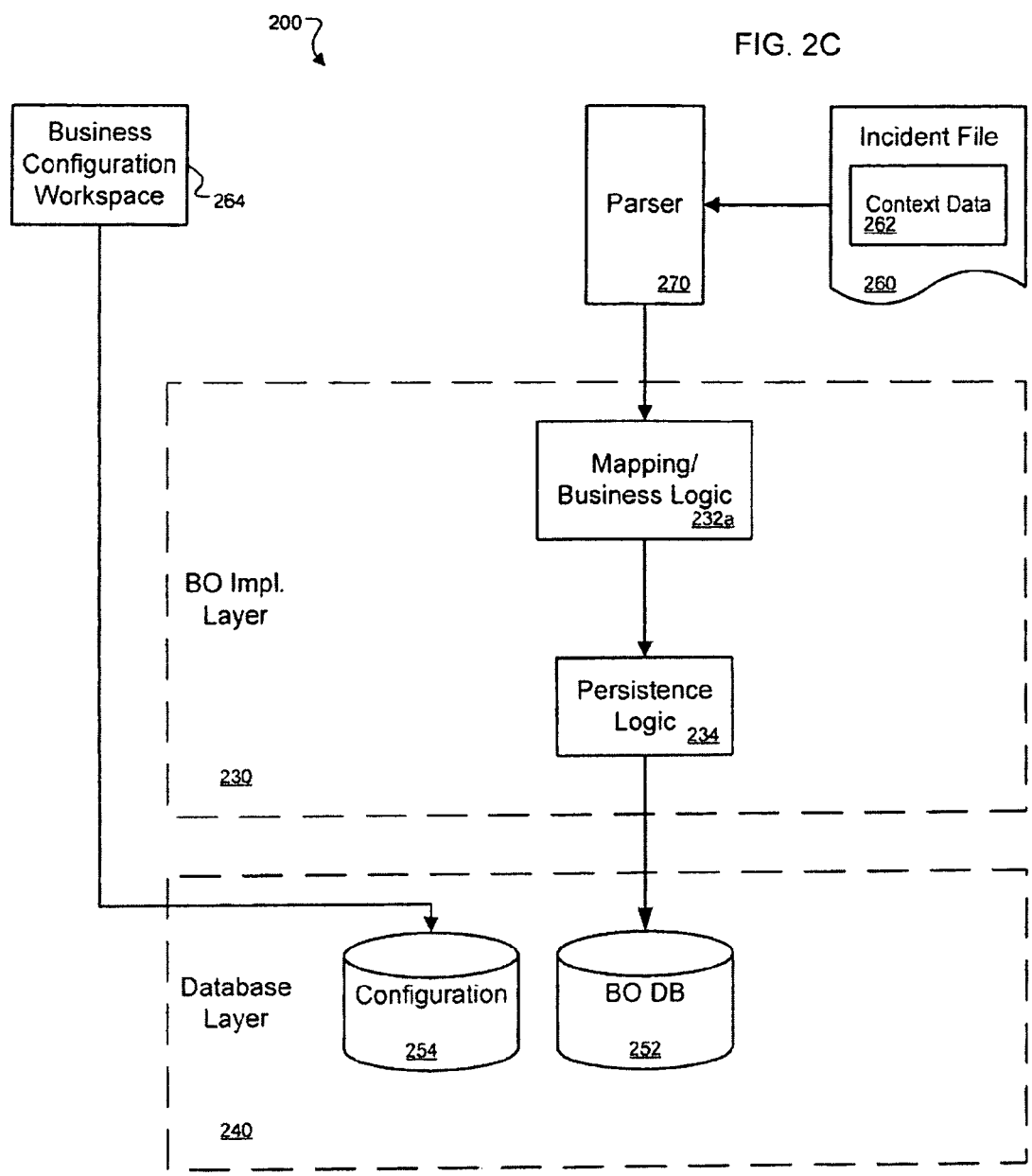

INCIDENT SIMULATION SUPPORT ENVIRONMENT AND BUSINESS OBJECTS ASSOCIATED WITH THE INCIDENT

TECHNICAL FIELD

This application relates to software support and, more particularly, to servicing, managing, or otherwise supporting applications.

BACKGROUND

Organizations and businesses depend on software deployed throughout their computing infrastructures to perform tasks relevant to their respective fields. As these entities begin using more enterprise software solutions, enterprise-wide software support becomes a necessary corollary to the software itself, as technical issues and performance errors may inevitably arise during the software's normal operations. For example, a customer may experience technical errors affecting the operations of the current software. In some support solutions, the customer may be required to submit or report the error through a manual process. Upon receiving the error report or notice, the support provider may manually analyze the error, diagnose the problem, and determine the proper solution. Once found, the support provider may relay the solution to the customer, who may then attempt to implement the steps of the provided solution. In some of these situations, such as those involving a customer support phone hotline, the customer generally needs a rudimentary level of knowledge regarding the software to ensure that the dialog between the technical consultant and the customer is clear enough to allow for a successful resolution to the issue.

Conventionally, support technicians and users need access to a customer's system in order to debug and otherwise troubleshoot the software. Sometimes, technicians may work with a copy of the production work environment, but even then it is not always possible to recreate the error.

Analyzing errors that occur within client systems can be a labor intensive endeavor. There are many types of errors that may occur within a system and each may require a different level of debugging. Three types of errors typically require some amount of code debugging. In order of severity, they are: program termination errors, business process errors, and simple miscalculations. Program termination errors are the most severe and result in the termination of the execution of a client's backend system. Debugging program termination errors generally requires recreation or simulation of the error and its accompanying data dump in a support system because it is typically undesirable for testing to be performed in a production environment. Support technicians may need to debug the logic contained in all levels, even down to the implementation details of certain business objects.

Business process errors, as the name implies, halt the execution of a business process, even though the overall system may continue to run. For example, a system may prevent the saving of a PurchaseOrder business object order because of a technical error (e.g., inappropriate divide by zero) or a business logic error. A business logic error may result from applying an incorrect business rule. For example, there may be a legal requirement applicable to business done in Italy requiring that certain tax documents be created before closing a certain business order object. If the requirement were applied in a Spanish context, the system may prevent a user from closing the PurchaseOrder business object instance for failing to create an irrelevant document that the wrongly configured system required. This type of incident may also require debugging the logic of a business object. The third type of incident is a simple miscalculation. With this category of error, the system may be technically sound, but errors in logic prevent the system from producing correct results. For example, a pricing function, which should appropriately apply two rebates, may apply only the first, resulting in the wrong price for a good.

SUMMARY

This disclosure provides various embodiments of software for supporting a business application. In one aspect, software for supporting a business application includes computer readable instructions embedded on media that is operable when executed to receive error information and dynamic context information from a remote business application in response to an incident. The dynamic context information at least partially identifies one or more business objects associated with the incident. The software is further operable to clone at least one of the one or more business objects associated with the incident. The software is also operable to start a transaction simulating the incident. When requested by a support user, the software is operable to start a debugging session running concurrently with the transaction simulating the incident.

One or more of the following features may also be implemented in any combination. The software can be further operable when executed to disable one or more business consistency checks before cloning the at least one of the one or more business objects. The software can be further operable when executed to copy data that were involved in the incident, wherein the data comprises at least one of: business configuration data, user data, organizational data, master data, and transactional data. Cloning can include executing a cloning service implemented on at least one of the one or more business objects. The at least one of one or more business objects that were cloned can include portions that are stored in a business object database. Starting the transaction can include starting a user interface that simulates the user interface of the remote business interface during the incident. Starting the transaction can include retrieving a portion of the data associated with a cloned business object by executing business logic contained in the cloned business object. Starting the transaction can include retrieving a portion of the data associated with a cloned business object by executing persistence logic. The debugging session allows a user to trace code in all levels of a software stack associated with the transaction simulating the incident.

In another aspect, software for supporting a business application includes computer readable instructions embedded on media and operable when executed to receive error information and dynamic context information from a remote business application in response to an incident. The incident includes a particular execution environment when the incident was created. The dynamic context information at least partially identifies one or more business objects associated with the incident. The software is further operable to start a transaction simulating the incident and to redirect service calls to a plug-in. The plug-in parses through the dynamic context information to return data that simulate the particular execution environment when the incident was created. When requested by a support user, the software is also operable to start a debugging session that runs concurrently with the transaction simulating the incident.

One or more of the following optional features may also be implemented in any combination for this and other aspects. The software can be further operable to copy data that were involved in the incident, wherein the data includes at least one of: business configuration data, user data, organizational data, master data, and transactional data. The software can be further operable to load into memory one or more business objects associated with the incident such that the business logic contained within the business objects is executed instead of redirecting to the plug-in. Redirecting service calls includes redirecting to the plug-in-only service calls to a database layer. The debugging session can allow a user to trace code in all levels above the database layer of a software stack of the transaction simulating the incident. Starting the transaction simulating the incident can include starting a user interface that simulates the user interface of the remote business interface during the incident.

While generally described as software, some or all of these aspects may be further included in respective systems or other devices for executing, implementing, or otherwise supporting a suitable software application. The details of these and other aspects and embodiments of the disclosure are set forth in the accompanying drawings and the description below. Other features, objects, and advantages of the present disclosure will be apparent from the description and drawings, and from the claims.

DESCRIPTION OF DRAWINGS

FIG. 2C illustrates an architecture diagram of a computing system for populating business object and configuration data for an incident simulation environment;

DETAILED DESCRIPTION

Figure 1:
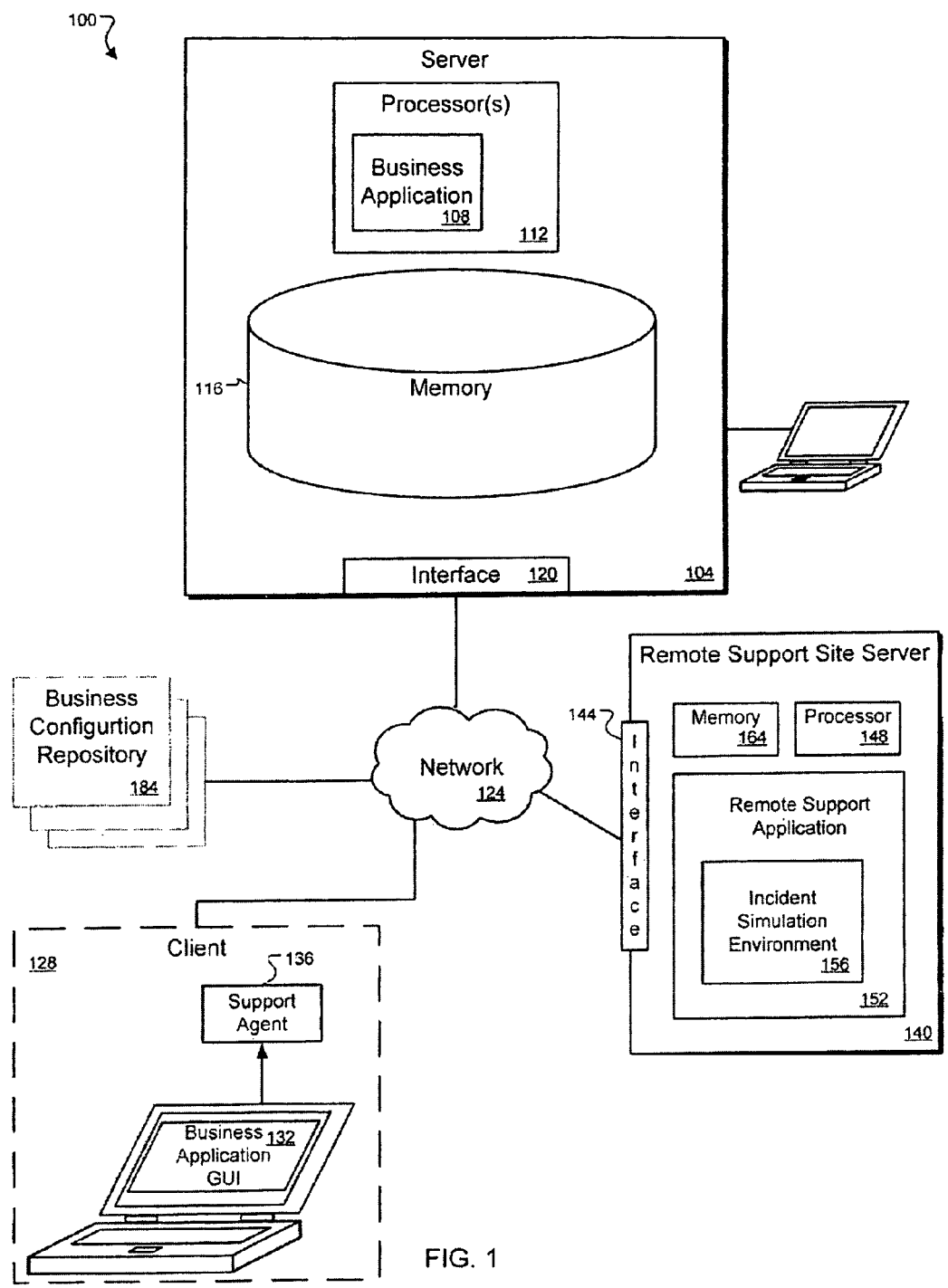
FIG. 1 illustrates at least a portion of an enterprise or data processing environment implementing or facilitating the technical support of a business application.

FIG. 1 illustrates at least a portion of an enterprise or data processing environment 100 implementing or facilitating the technical support of a business application 108. For example, this disclosure generally involves simulation of an incident in a (typically remote or unaffiliated) support system, which means the context data of the incident is taken to "reconstruct" the incident at the software support site. According to the particular implementation, this simulation can be done in several grades of complexity: e.g., i) start the UI with data from the incident that are filled from the incident context into the UI without saving them into the database tables of the business objects, or ii) store the incident context data in the database tables of the business objects and replay the complete transaction. As such, this disclosure describes preparation of a support system with collected incident context data and use of the model information on business objects, UIs, etc. so that the transaction in which the incident occurred in the customer system can be restarted and the support employee can analyze it, e.g. by debugging, tracing, etc. In some situations, the support user may analyze the incident without a need to log into the client system. This ability can help save time and effort by reducing the need to contact the customer, to create a support user on the client system, to reproduce the incident on the client system's production environment, to verify that the client's test or backup system is adequately configured and populated to reproduce the production incident, and so forth. In another example, the end users may also be enabled to solve incidents quickly and efficiently by working with a more involved or knowledgeable support representative. Various embodiments may have none, some, or all of these—as well as other—advantages.

Turning to FIG. 1, environment 100 may include or be communicably coupled with the server 104, one or more clients 128, a network 124, the remote support site server 140, and a business configuration repository 184. More specifically, example environment 100 utilizes the business application 108 running within a server 104. This business application 108 may be more highly modeled (business process model, business object model, business configuration model, etc.) such that implementations are well known and understood. Moreover, in some cases, implementing entities, such as customers, may be prohibited or discouraged from modifying the application, which helps ensure that the software (based on version, configuration, implementation, and so forth) can be systemically cloned, reproduced, or otherwise supported remotely. In these cases, software changes are applied by updates (service packs) or patches through the defined software maintenance process. Moreover, in certain situations, business configuration of the systems is available in one central place (such as in the business configuration design time). This business application 108 is in (direct or indirect, whether synchronous or asynchronous) communication with a support application 152 located at a remote, or unaffiliated, support server 140 in order to provide support to the business application 108. In general, when an error or incident occurs on a client 128, an incident request is either manually or automatically generated and sent to the support application 152. In generating the request, the client 128 and/or its support agent 136 capture the environment and the current state of objects which are relevant to analyzing the incident. This may be placed in an incident file (e.g., incident file 260 in FIG. 2A). The support application 152 may use the context data in the incident file to recreate the transaction that caused the incident. A support user may then replay the transaction in the incident simulation environment to debug and otherwise troubleshoot the incident.

Servers 104 and 140 include memory 116 and 164, as well as one or more processors 112 and 148, respectively, and comprise electronic computing devices operable to receive, transmit, process, store, or manage data associated with the system. Generally, this disclosure provides merely one example of computers that may be used with the disclosure. As used in this document, the term "computer" is intended to encompass any suitable processing device. For example, the environment 100 may be implemented using computers other than servers, as well as a server pool. Indeed, either of or both server 104 and remote support site server 140 may be adapted to execute any operating system including Linux, UNIX®, WINDOWS SERVER®, or any other suitable operating system. According to one embodiment, either server 104 or server 140 may also include or be communicatively coupled with a web server and/or a mail server.

Memory 116 and 164 may include any memory or database module and may take the form of volatile or non-volatile memory including, without limitation, magnetic media, optical media, random access memory (RAM), read-only memory (ROM), removable media, or any other suitable local or remote memory component. For example, memory 116 and 164 may store classes, frameworks, applications, backup data, jobs, or other information that includes any parameters, variables, algorithms, instructions, rules, or references thereto. The memory 116 and 164 may also include any other appropriate data such as VPN applications, firmware logs and policies, firewall policies, a security or access log, print or other reporting files, HTML files or templates, and others.

Another data store, the business configuration repository 184, may also be present within the environment 100. In the specific embodiment of FIG. 1, the business configuration repository 184 is shown external to the remote support site server 140 and memory 164. In other instances, the business configuration repository 184 may be stored internal to memory 164 among the other data stores. Regardless of its location within the environment 100, the business configuration repository 184 provides a centralized location for storing business configuration data that may make up the backbone of the environment 100. Specifically, the business configuration repository 184 may include a static context information repository. This static context information repository may store static information relating to the clients 128, business applications 108, and servers 104 of the environment 100. Some examples of the information collected in the static context information repository may include the customer type, the type of client 128, the release or version of the specific business application 108, contractual limitations or requirements of the client 128 or server 104, service levels of the associated customer, and other information that remains relatively static in the normal course of operations. Some of the static context information may be collected the first time a particular client 128 accesses the business application 108 or the network 124 in general. In some of those embodiments, a support agent 136 at the client 128 may collect particular static context data and provide the information to the static context information repository for storage. In other embodiments, the information may be retrieved by the business application 108 at certain intervals during operation. Of course, static information may change over time or in response to certain events (such as a pricing increase, change in licensing terms, employee turnover, software or equipment upgrades, etc.), but are generally stored at the business configuration repository 184 as such information may span (or apply to) a multitude of errors. In other instances, the business configuration repository 184 may include business configuration data other than the static context information repository.

Illustrated servers 104 and 140 also include processors 112 and 148, respectively. Each processor executes instructions and manipulates data to perform the operations of the associated server such as, for example, a central processing unit (CPU), a blade, an application specific integrated circuit (ASIC), or a field-programmable gate array (FPGA). Although described as a single processor in the servers 104 and 140, multiple processors 112 and 148 may be used according to particular needs, and references to processors 112 and 148 are meant to include multiple processors where applicable. In this particular illustration, processor 112 executes the business application 108, while processor 148 executes the support application 152.

At a high level, business application 108 is any application, program, module, process, or other software that may execute, change, delete, generate, or otherwise manage business information, according to the present disclosure. In certain cases, environment 100 may implement a composite application 108. For example, portions of the composite application may be implemented as Enterprise JAVA™ Beans (EJBs) or design-time components may have the ability to generate run-time implementations into different platforms, such as J2EE™ (JAVA™ 2 Platform, Enterprise Edition), ABAP (Advanced Business Application Programming) objects, or MICROSOFT's .NET®. Further, while illustrated as internal to server 104, one or more processes associated with application 108 may be stored, referenced, or executed remotely. For example, a portion of application 108 may be a web service that is remotely called, while another portion of application 108 may be an interface object bundled for processing at remote client 128. Moreover, application 108 may be a child or sub-module of another software module or enterprise application (not illustrated) without departing from the scope of this disclosure. For example, client 128 may access business application 108 on server 104, or even as a hosted application located over network 124, without departing from the scope of this disclosure. In another example, portions of business application 108 may be used by the customer working directly at server 104, as well as remotely at client 128. In yet another example, business application 108 may be hosted by a third party relatively unrelated to either the customer (represented in this case as client 128) or the service provider (represented in this case as server 140). Additionally, the client 128, the business application 108, and the support application 152 may be controlled by a third party.

More specifically, business application 108 may be a composite application, or an application built on other applications, that includes an object access layer (OAL) and a service layer. In this example, application 108 may execute or provide a number of application services such as customer relationship management (CRM) systems, human resources management (HRM) systems, financial management (FM) systems, project management (PM) systems, knowledge management (KM) systems, and electronic file and mail systems. Such an object access layer is operable to exchange data with a plurality of enterprise base systems and to present the data to a composite application through a uniform interface. The example service layer is operable to provide services to the composite application. These layers may help composite application 108 to orchestrate a business process in synchronization with other existing processes (e.g., native processes of enterprise base systems) and leverage existing investments in the IT platform. Further, composite application 108 may run on a heterogeneous IT platform. In doing so, composite application 108 may be cross-functional in that it may drive business processes across different applications, technologies, and organizations. Accordingly, composite application 108 may drive end-to-end business processes across heterogeneous systems or sub-systems. Application 108 may also include or be coupled with a persistence layer and one or more application system connectors. Such application system connectors enable data exchange and integration with enterprise sub-systems and may include an Enterprise Connector (EC) interface, an Internet Communication Manager/Internet Communication Framework (ICM/ICF) interface, an Encapsulated PostScript (EPS) interface, and/or other interfaces that provide Remote Function Call (RFC) capability. It will be understood that while this example describes the composite application 108, it may instead be a standalone or (relatively) simple software program. Regardless, application 108 may also perform processing automatically, which may indicate that the appropriate processing is substantially performed by at least one component of system 100. It should be understood that this disclosure further contemplates any suitable administrator or other user interaction with application 108 or other components of environment 100 without departing from its original scope. While described as an application operating within a business environment, "business application" includes any software application that is being supported by a separate (perhaps remote or third party) support module, namely support application 152.

Support application 152, executed by processor 148, may be any application, program, module, process, or other software that may implement or execute the support functions and processes according to the present disclosure. Support application 152 may also include the capabilities to access, query, change, delete, generate, or otherwise manipulate the elements within memory 164. In certain embodiments, support application 152 is able to communicate with the business application 108 in order to send and receive relevant support information. It will be understood that while support application 152 is generally described as being remote from business application 108 or as affiliated with a third party, the support software can be local to the incident or owned or operated by the entity executing business application 108 as appropriate. In the latter situations, this can allow internal support staff the ability to more efficiently and quickly test, debug, trace, or otherwise support other departments without affecting the production environment or maintaining a full-copy test system. Further, while illustrated as internal to the support site server 140, one or more processes associated with support application 152 may be stored, referenced, or executed remotely from server 140. For example, a portion of application 152 may be a web service that is remotely called, while another portion of the application 152 may be an agent, such as support agent 136 (described in more detail below), bundled for processing at remote client 128. Moreover, application 152 may be a child or sub-module of another software module or enterprise application (not illustrated) without departing from the scope of this disclosure. In some embodiments, the support application 152 may be communicatively coupled to a billing system, perhaps part of the business application. In other situations, the billing system may comprise a third party billing application or distributor. When support personnel spend time using the support application 152, the billing system may be notified and may keep track of the time spent working for the customer. In some instances, the billing system may charge per incident, per time spent working, or any other method of calculating the support. In still other instances, various levels of support may be included with the contract between the customer and support provider. In those cases, the billing system may still keep track of the time spent working for the customer so that various metrics, such as billable support time, may be kept. In some situations, the billing system may automatically process and aggregate the various support times, generate bills, and electronically forward the bills to the customers or debit the customer's account.

The support application 152 may read and analyze the technical error and dynamic context information provided by the business application 108 and the support agent 136, and static context information retrieved from the business configuration repository 184, in addition to other relevant information provided to the support application 152. Upon analyzing the information, the support application 152 may perform a number of tasks. In one instance, the support application 152 may analyze the combination of information and, using the functionality of the network 124 and the GUI 132 located at the client 128, display the analyzed data into a readable and usable format. Customers and support personnel may review the information through the GUI 132 at the client 128 to help find possible solutions to the technical error. For example, the analyzed information may be portrayed by a business process view, a business object view, a business configuration view, or a system landscape view. The different views support the customer by displaying the analyzed context and error data for efficient and complete analysis of the specific problem experienced by the customer. In some instances, the analyzed information from the support application 152 is used to generate a simulated business application 108 environment, such as incident simulation environment 156. By generating simulation environment 156, support personnel may analyze the business application 108 as it existed at the time of the error, as well as the interactions throughout the environment 100 that may have led to the error's occurrence.

Servers 104 and 140 may include interfaces 120 and 144 for communicating with other computer systems, such as clients 128, or each with other over the network 124, in a client-server or other distributed environment. Generally, interfaces 120 and 144 comprise logic encoded in software and/or hardware in a suitable combination and operable to communicate with the network 124. More specifically, interfaces 120 and 144 may comprise software supporting one or more communications protocols associated with communications such that the network 124 or hardware is operable to communicate physical signals.

The network 124 facilitates wireless or wireline communication between the server 104 and any other local or remote computer, such as the clients 128. Indeed, while illustrated as one network 124, network 124 may be a discontinuous network without departing form the scope of this disclosure, so long as at least a portion of network 124 may facilitate communications between senders and recipients. The network 124 may be all or a portion of an enterprise or secured network. In some instances, a portion of the network 124 may be a virtual private network (VPN) merely between the server 104 and the client 128 across a wireline or wireless link. Such an example wireless link may be via 802.11a, 802.11b, 802.11g, 802.20, WiMax, and many others. In other words, the network 124 encompasses any internal or external network, networks, sub-network, or combination thereof operable to facilitate communications between various computing components in the system. The network 124 may communicate, for example, Internet Protocol (IP) packets, Frame Relay frames, Asynchronous Transfer Mode (ATM) cells, voice, video, data, and other suitable information between network addresses. The network 124 may include one or more local area networks (LANs), radio access networks (RANs), metropolitan area networks (MANs), wide area networks (WANs), all or portion of the global computer network known as the Internet, and/or any other communication system or systems at one or more locations. In certain embodiments, the network 124 may be a secure network associated with the enterprise and certain local or remote clients 128. In the present environment 100 of FIG. 1, the server 104, the remote support site server 140, and the business configuration repository 184 are connected by the network 124.

The client 128, illustrated in FIG. 1, may be any computing device operable to connect or communicate with server 104, server 140, or the network 124 using a wireline or wireless connection. At a high level, each client 128 includes at least the GUI 132 and, in some cases, the support agent 136, and comprises an electronic computing device operable to receive, transmit, process, and store any appropriate data associated with the business application 108 and the support application 152. It will be understood that there may be any number of clients 128 communicably coupled to the server 104. For example, the clients 128 may include two local clients, as illustrated in FIG. 1, as well as other clients external to the illustrated portion of the network 124. Further, "the client 128," "analyst," "customer," and "user" may be used interchangeably as appropriate without departing from the scope of this disclosure. For example, the analyst may access a first instance of the business application 108 on a first client 128, while an end user may use a second instance of the business application 108 on a second client 128. Moreover, for ease of illustration, each client 128 is described in terms of being used by one user. But this disclosure contemplates that many users may use one computer or that one user may use multiple computers. As used in this disclosure, the client 128 is intended to encompass a personal computer, touch screen terminal, workstation, network computer, kiosk, wireless data port, smart phone, personal data assistant (PDA), one or more processors within these or other devices, or any other suitable processing device. For example, the client 128 may comprise a computer that includes an input device, such as a keypad, touch screen, mouse, or other device that can accept information, and an output device that conveys information associated with the operation of the server 104 or the clients 128, including digital data, visual information, or the GUI 132. Both the input device and output device may include fixed or removable storage media, such as a magnetic computer disk, CD-ROM, or other suitable media to both receive input from and provide output to users of the clients 128 through the display, namely, the GUI 132.

Some of the illustrated clients 128 include the support agent 136. The support agent 136 may be an agent, daemon, object, library, service, or other software that is reactive to certain events occurring with respect to the client 128. When present at client 128, support agent 136 may be communicably coupled with the support application 152 using asynchronous or synchronous communications. For example, agent 136 may monitor client 128 and, upon detecting an error, send the error and various business data to the support application 152. In another example, agent 136 may detect a change in client 128, such as a hardware upgrade, and communicate a change in such relatively static information. Indeed, support agent 136 may be operable to send any amount of business data to support application 152, often upon request. More specifically, the support agent 136 can intercept error messages, signals, and events concerning the related client 128, or the client 128 may actively supply the support agent 136 with notification of and data regarding the error. In some embodiments, the support agent 136 may determine, based on the error event, the specific technical error, or instead, a code or other marker indicating a certain error has occurred. In other embodiments, the support agent 136 may receive a report from the client 128 describing the error. Additionally, the support agent 136 may analyze or retrieve a set of dynamic context information regarding the client 128 and the business application 108 at the time of the error. Such information may include the particular screen the client 128 was on at the time of the error, the particular machine type of the client 128, and other information that may vary at different instances during operation of the business application 108. The dynamic context information may be included in an incident file. As described above, multiple clients 128 may use the business application 108 in the current environment 100. Therefore, the clients 128 and the other computers accessing the business application 108 may have different specifications and software that are relevant to the technical issues experienced. Thus, the support agent 136 may collect this dynamic context information, in addition to any error information, and provide the information to the support application 152 for further action. Moreover, support agent 136 may provide or facilitate the presentation of potential solutions via GUI 132.

GUI 132 comprises a graphical user interface operable to allow the user of the client 128 to interface with at least a portion of environment 100 for any suitable purposes such as to allow the client 128 to interact with the business application 108 and, in the event of a technical error, provide an interface with the support application 152 to help support the business application 108. Generally, the GUI 132 provides the client 128 with an efficient and user-friendly presentation of data provided by or communicated within the system. In particular, GUI 132 may provide the user of business application 108 with access to data stored within memory 116. The GUI 132 may comprise a plurality of user interface (UI) elements such as interactive fields, pull-down lists, and buttons operable at the client 128. These UI elements may be associated with support functions provided by the support application 152 and the business application 108 for requesting or receiving information related to support of the business application 108. In some embodiments, the GUI 132 may provide an interactive display of the context information provided to the support application 152 when a technical error is reported by the business application 108. Moreover, it should be understood that the term graphical user interface may be used in the singular or in the plural to describe one or more graphical user interfaces and each of the displays of a particular graphical user interface. Therefore, the GUI 132 contemplates any graphical user interface, such as a generic web browser, touch screen, or command line interface (CLI) that processes information in environment 100 and efficiently presents the results to the user. The server 104 can accept data from the client 128 via the web browser (e.g., Microsoft Internet Explorer or Mozilla Firefox) and return the appropriate HTML or XML responses using the network 124.

In other implementations, the business application 108, the support application 152, and the business configuration repository 184, may be managed by a single provider, perhaps as a hosted solution. Notably, the business application 108 and support application 152 may communicate through the internal connections of the respective server. Additionally, at least a portion of the error and context information related to the technical error at the business application 108 that was sent via the network 124 from the client 128 to the support application 152, may instead be communicated internal to the server. Clients 128 may still contain the support agent 136 and connect to the server 140 via the network 124. In such a hosted environment, the client 128 may log in to the remote server and run the business application 108 from a web browser or other similar interface. When an error is reported by or to the support agent 136, the error information and the dynamic context information of the client 128 is sent to the support application 152 communicably coupled to the business application 108. Clients 128 may include a set of local environment and application data specific to each instance of the client 128. This information may be included with the error and dynamic context information associated with the business application 108, and sent to the support application 152 in the form of an incident file. Using the incident file along with the static context information stored at the business configuration repository 184, the support application 152 may analyze and present the relevant information to the customer and/or support personnel at the client 128 through the GUI 132 within an environment closely resembling the client's, such as the incident simulation environment 156.

Figure 2A:
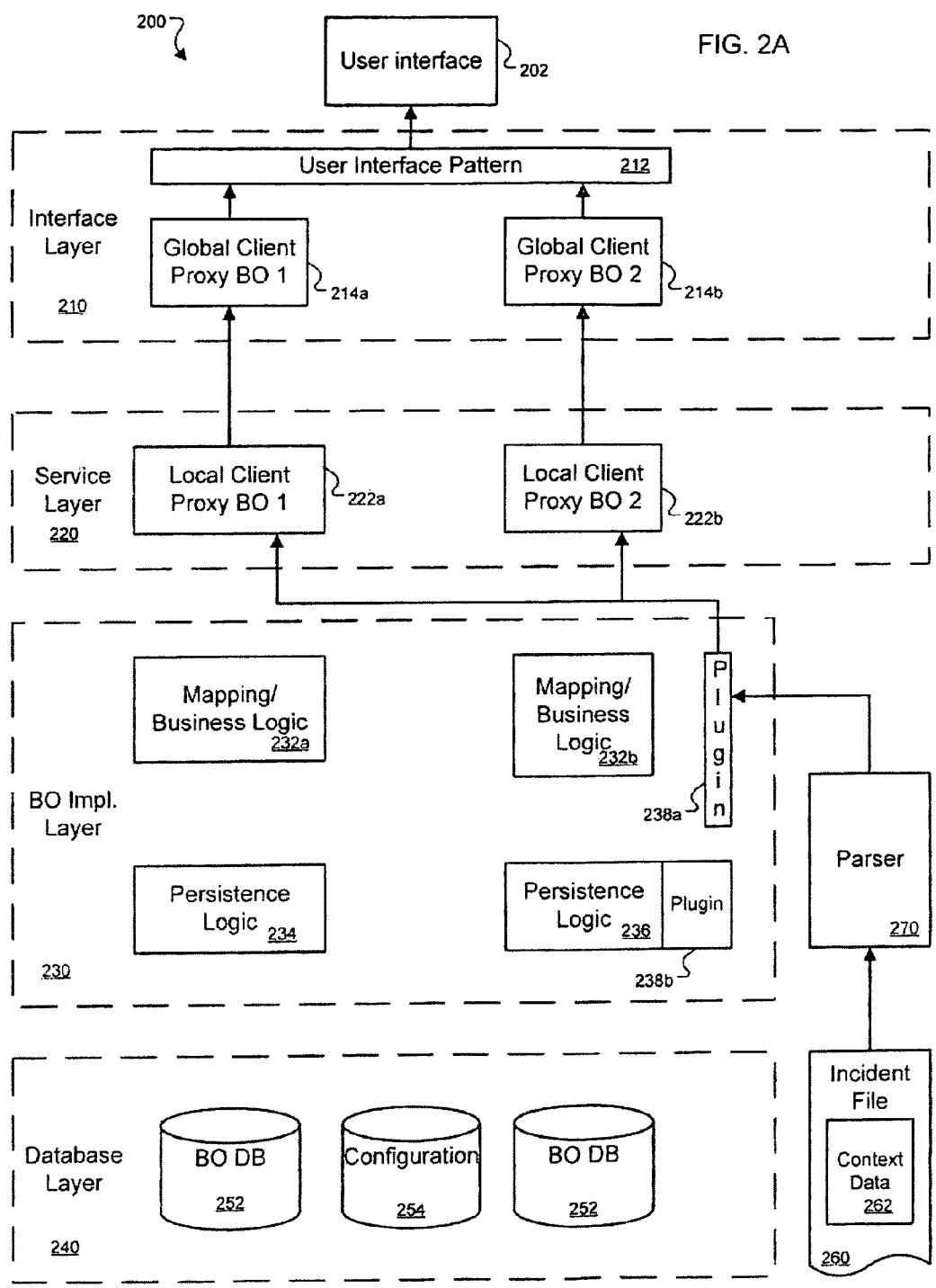
FIG. 2A illustrates an architecture diagram of a computing system for providing an incident simulation environment.
Figure 2B:
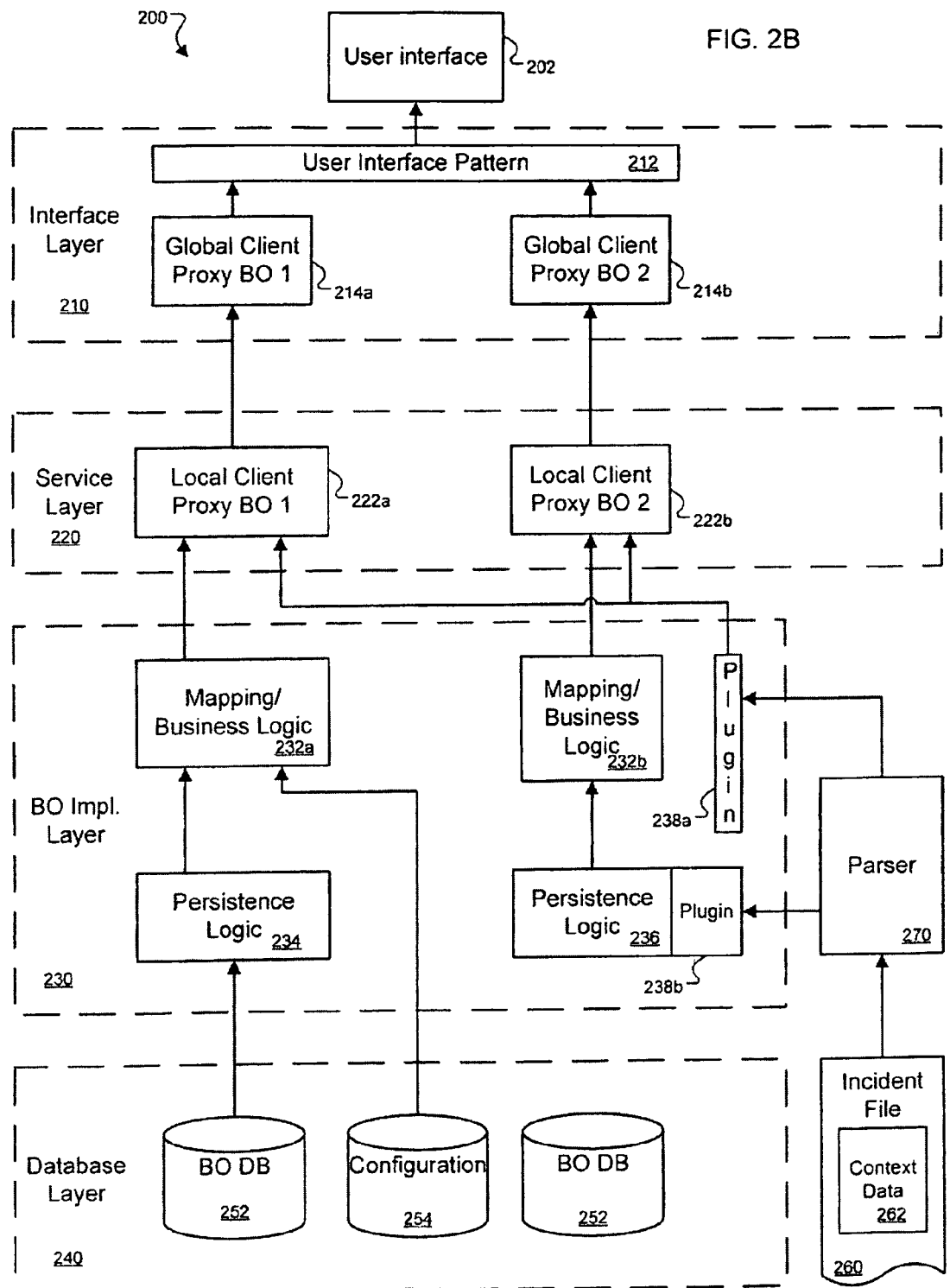
FIG. 2B illustrates an architecture diagram of a computing system for providing an incident simulation environment.

FIGS. 2A-2C illustrate an architecture 200 of an incident simulation environment 156. The incident environment architecture 156 includes a user interface layer 210, a service layer 220, a business object (BO) implementation layer 230, a database layer 250, plug-ins 238, and a parser 270. Generally, a support request involving an incident on a client system is received by a support application 152 and assigned to a support user for analysis. The support user may analyze the incident using information at various layers of the architecture 200. Depending on the depth of analysis, business object data may or may not be cloned in the support system. When business object data is cloned in the support system (see FIG. 2C), the incident file 260 is parsed by the parser 270 to clone business objects into the support system, and ultimately the BO database 252. When business object data is not cloned (see business object BO 1 and BO 2 in FIG. 2A and business object BO 2 in FIG. 2B), calls to a lower layer of the architecture (e.g., the BO implementation layer 230 or database layer 250) are redirected. The system then uses the parser 270 to retrieve data from the incident file 260. One or more plug-ins 238 may be used to redirect the lower layer calls to the parser 270 in order to obtain relevant information from the incident file 260. The two approaches (cloning and non-cloning) may be combined. That is, some business objects may be cloned while others are not, and thus data may be retrieved from the business object database 252 for some business objects and from the incident file 260 for others (see FIG. 2B).

Figure 4:
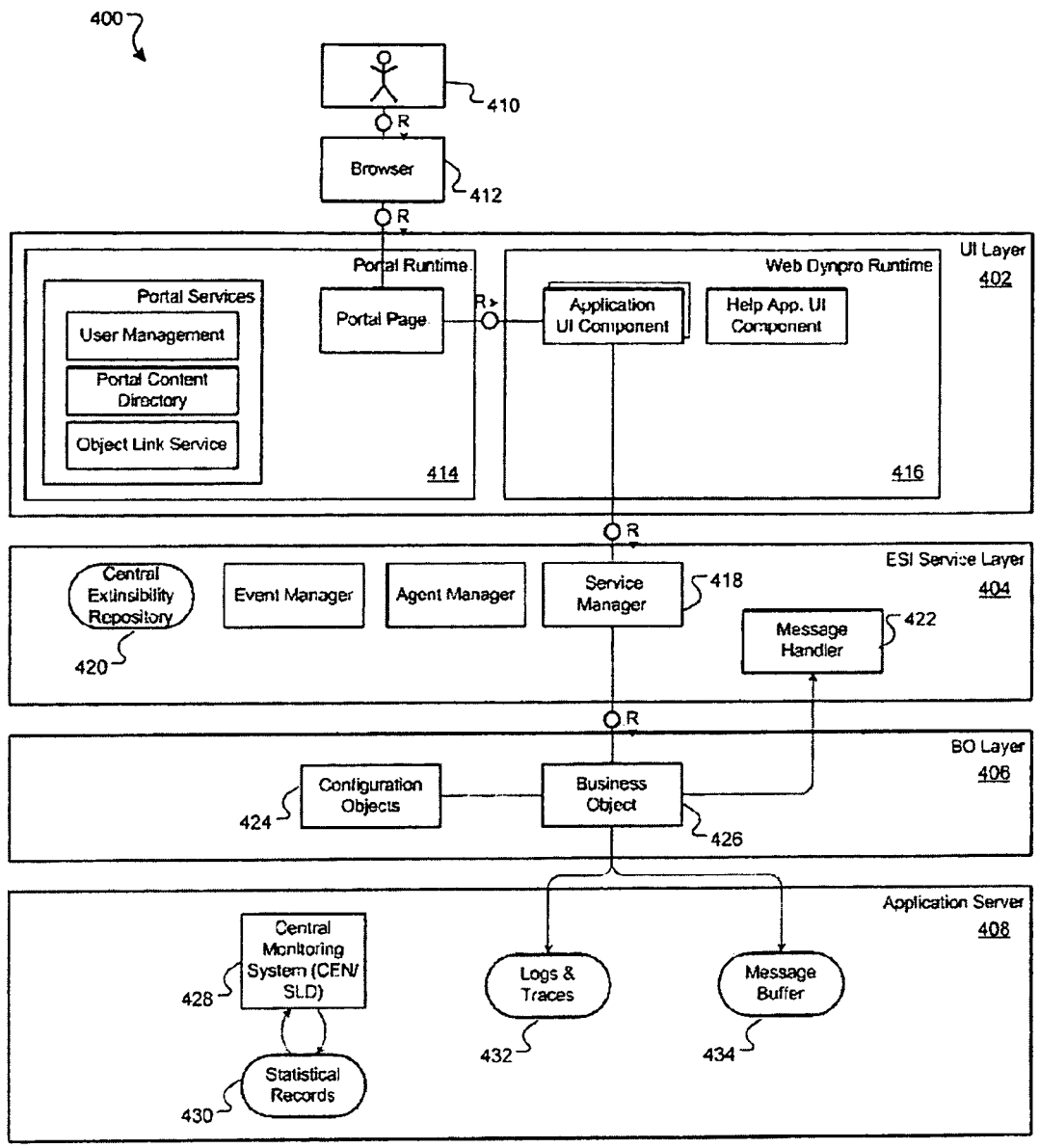
FIG. 4 illustrates an architecture diagram of a client system that collects context data in an incident file.

The incident file 260 contains context data 262 retrieved from a client 128 at the reporting of an incident or the initiating of a support request to the remote support application 152. The incident file may conform to any of a variety of formats, such as XML. The context data 262 contained in the incident file 260 may include relevant system and business information obtained from one or more architectural layers 400 of the client system (see FIG. 4), which includes: a UI Layer 402, an ESI service layer 404, a BO Layer 406, and an application server layer 408. Some of these layers correspond directly with the layers of the example incident simulation environment 156 shown in FIG. 2A.

Relevant information may be defined on a layer-by-layer basis and can generally relate to (a) generic data provided by the infrastructure (e.g., statistical records) or a message log; or (b) components specific data defined by each component individually with respect to understanding an error situation and performing error cause identification and resolution thereto (this component-specific data is especially relevant for the BO Layer 406).

The UI Layer 402 may consist of the front-end runtime which, in turn, includes a Portal Runtime 414 and a model-based runtime component 416. This component is associated with any pattern-based programming model for user interfaces, especially user interfaces for business applications. The UI layer 402 of client applications may be implemented, for example, using Java. Relevant context data 262 obtained from this layer may include, for example, user data, work center and role definition, as well as displayed fields with input data/content.

The UI Layer 402 may obtain data such as a user ID of the end user (e.g., the person creating the incident message). A session ID may also be obtained to determine the session from which the support request has been initiated. A pattern and floor plan from which the call has been sent may also be obtained. Additionally, a portal role to which the end user has been assigned may be obtained. This role may be pertinent to the authorizations, worksets the user can see, and the layout of the pages in the portal.

The UI Layer 402 may also obtain information characterizing a work set that the end user is currently working in to enable an identification of a screen which is being presented to the end user when initiating the incident message. Some worksets may additionally comprise notes which may be obtained and form part of the context data 262.

Additional information that may be obtained by the UI Layer 402 includes a locale parameter characterizing the browser utilized by the end user, the language the user is logged on, local time, and the like; and an application ID of the application UI component(s) that are visible as part of the work set. Furthermore, the context data 262 from the UI layer 402 may provide an intelligent screenshot that contains data that was presented to the end user at the time the incident message was initiated. By providing such information (which may comprise, in some variations, a screenshot of the entire screen/window being presented to the initiating and/or an identification of omitted fields, etc.), a support user may be provided with sufficient data to reproduce the problem and perform some high-level troubleshooting.

The ESI Layer 404 may include the service manager 418 and, additionally, a message handler 422, where internal and external error messages from the application are stored for a certain session. The ESI Layer 404 may also optionally include a central extensibility repository 420. Relevant context data 262 obtained from the ESI Layer 404, includes, for example, registered/called services or process steps in the BO Layer 406.

In ESI Layer 404, all metadata of business objects is stored (in terms of process flow, called service, etc.). Therefore, the ESI Layer 404 may deliver all generic (as opposed to application component-specific) information. This generic information may include all registered services that are called throughout the session using a service manager. The service manager collects information about registered services or buffer data from ESI layer 404, as well as all ESI framework information, that is retrieved by the service manager itself. Other context data 262 that may be obtained from the ESI layer 404 includes traces of data flow for the service interface and data characterizing transient messages in the message handler 422.

The BO layer 406 is the software layer in which the business objects 426 (and, additionally, configuration objects 424) are implemented, using, for example, ABAP or Java coding. Relevant context data 262 obtained from the BO Layer 406 include, for example, configuration data or transaction data.

Context data 262 derived from the BO Layer 406 may include called business object(s) which are clearly identified by business object type (e.g., PurchaseOrder) and business object ID. Additional characteristics of business objects, such as its respective configuration data, may be obtained for the context data 262. Other characteristics may relate to how a particular business object may be and is used. For example, in the area of "determination," a list of potential determinations in the system, which of these determinations have been activated, and how they have been or will be used, may also be utilized.

Information regarding available extensions (e.g., including their configurations) may also be obtained from the BO layer 406; as well as information relating to a system expectation regarding a field value. For example, the system knowing what type of data it expects therefore can determine valid values that can be entered into a field. Thus, the system has to be able to assess whether or not the entered field value is a valid one or not and should display this accordingly.

Information regarding called methods and performed actions may be used to generate the context data 262. In the BO layer 406, in some variations, only the actual used implemented method of core service operations and the actual performed action is needed. The context data 262 may also comprise data characterizing a trace, recording the actual performed "action" from the beginning of the session up to the time the error occurs.

Moreover, the context data 262 obtained from the BO layer 406 may include information relating to an affected business object including information about all its business objects nodes (e.g., all elements of such business object which point to a node in the associated data model). With this information, each node can be identified by a key and contains a fixed amount of attributes. In addition, information about the associations of the business objects (e.g., directed relationships between business object nodes) can be identified. Services for navigation on top of the nodes are assigned to the association (which may be a composition or an aggregation association).

Context data 262 may also include BO data as of the time the error/incident occurred. Checkpoint data at critical places in program coding can be used to provide context data 262 that characterizes an internal status of the program (and which may, for example, be written to a log). Rules may be pre-defined which determine when to classify a situation as critical and what related data to populate in the log.

The application server layer 408 refers to the technical layers of the infrastructure, such as a web application server, J2EE™ engine, LiveCache, portal Infrastructure, BI, XI, JTS, Database Interface, and the like. The application server 408 may comprise a central monitoring system 428 for monitoring various operating parameters of applications and for storing such parameters as statistical records 430. Moreover, the application server 408 may include a message log 432 that records messages relating to business object 426 and message buffer 434. Relevant context data 262 from the application server 408 include, for example, statistical records or system information such as software release and patch level.

The application server layer 408 may provide a transaction ID of the entire transaction throughout the solution (i.e., through the technology stacks) so that statistical records 430 may be generated. The statistical records 430 may characterize remote function calls to other components, database accesses, CPU usage, memory usage, data transfer to and from the database, database response time, and the like. The context data 262 may also utilize information regarding the agents called from the beginning of a session upon the time the error occurs and the "runtime" of each of these agents (which may be provided by a trace).

Operating system, software release version, patch level and implemented notes information may also form part of the context data 262. Such information may be used for both identifying bugs already fixed and upon which software version error corrections can be applied. Relevant information can be gained from the system landscape directory (SLD) and can also be read via the statistical records.

Turning back to FIGS. 2A-2C, a user may analyze various aspects of an incident. Some analysis may be performed efficiently without applying data to the support system. For example, a user may analyze the user interface layer data to determine whether a formatting error or mapping error may have caused the incident. To analyze the user interface layer data, the incident simulation environment may recreate the screen that was presented on the client when the error occurred. The support user may be able to view the same error messages, the user inputs, and fields that were presented on the client during the occurrence of the incident. By examining the recreated screen, a support user may determine whether the incident was the result of incorrect formatting in standardized fields, such as time, date, currency, and the like. Because the calls to the lower layer in this scenario are handled by a plug-in 238 and not the actual business logic, a support user may not be able to trace through the logic contained in the lower layers.

The system may recreate the user screen involved in the incident using business object data contained in the context data 262, without cloning the business objects themselves. After receiving and reading the incident file 260, the incident simulation environment 156 may begin simulating the original transaction. The system may start the transaction and user interface 202 using, for example, an object-based navigation (OBN) link. To retrieve BO data, the user interface 202 may call the service layer 220 to populate a local client proxy 222 with the business object data. The service layer 220 may be configured to first attempt to call the application implementation of the BO in the BO implementation layer 230 in order to retrieve the BO data. If the BO logic is not contained in the BO implementation layer 230 a distinct error may be returned. Upon receiving the distinct error, the system may call the plug-in 238a to retrieve the business data from the incident file 260.

For a variety of incidents, it may be helpful for a support user to analyze the incident by executing, tracing, and/or debugging the business logic. For example, if a program terminates, the support user may need to recreate the conditions during termination and trace through the code to isolate the portion of code that caused the termination. This deeper analysis may also benefit troubleshooting business process errors and simple miscalculations, whose root causes may not be discovered using the user interface layer data and other context data 262.

The system may load the logic of business objects into the BO implementation layer 230, given the information contained in the incident file 260. The persistence data may or may not be cloned. If the data is not cloned, then the persistence logic may use a plug-in 238b to retrieve data from the incident file 260. Similar to the use of the plug-in 238a, described earlier, the persistence logic 236 may attempt to retrieve data from the business object database 252, which may return a distinct error when the data from the BO database 252 is unavailable. This distinct error may be handled by the system to redirect the call to the plug-in 238b.

When the data is cloned, the persistence logic may call the BO database 252 to retrieve persistence data. As shown in FIG. 2C, the BO database 252 may be populated with business objects that are involved in the incident and retrieved in the context data 262. These business objects may be recreated as clones in the BO database 252. After populating the BO database 252, the system may start the simulation of the incident. Having fully recreated the business objects and persistence data, the full application stack may be executed (thus, able to be traced and debugged) and the complete transaction can be replayed. Full debugging and tracing on all levels may be possible during any part of the transaction simulating the incident. The business objects may also be changed and those changes saved as they would be in a client production system. This may also enhance debugging. Each business object may implement a "create as clone" service, which enables and/or facilitates the cloning of the business object. The business object implementation layer 230 may facilitate cloning by halting business logic and consistency checks.

Some embodiments use a business configuration workspace 264 that is loaded into a configuration database 254. The configuration database 254 includes code lists, schemas, and the like, that may be country specific (e.g., pricing and tax schemas). Other information pertinent to the business configuration of the customer may also be stored in the configuration database 254. In addition to configuration data and business objects, the following data may also be stored in the support system 152: user/authorization data, organizational data, master data, and transactional data. These different classes of data may need to be treated differently when copying them to the system. These data, like the business objects, may also be copied as technical clones into the system without business consistency checks.

Turning now to FIG. 2A, BO data is retrieved for BO1 and BO2, whose business logic and persistence data are not loaded into the incident simulation environment 156. In operation, a incident file 260 is received. The user interface 202 retrieves relevant business object data for BO1 and BO2 by accessing the service layer 220. The service layer 220 attempts to call the application implementation of the BO and receives an distinct error message. The call is redirected to plug-in 238*a*, which retrieves the relevant BO data from incident file 260 using parser 270. Parser 270 searches the context data 262 and returns the appropriate data. The support user may examine the retrieved data in the user interface 202.

Turning to FIG. 2B, BO data is retrieved for BO1, which is cloned in the incident simulation environment 156, and BO2, whose logic is loaded but data is not. For BO1, the user interface accesses the service layer 220, which calls the mapping/business logic 232*a* in the BO implementation layer 230. The mapping/business logic 232*a* in turn calls the persistence logic, which accesses the BO database 252 to retrieve the relevant BO data for BO1. At each layer and call, a support user may trace the execution of the program through all the parts of the application stack and may debug accordingly.

For BO2, the user interface accesses the service layer 220 in a fashion similar to the retrieval of data for BO1. The service layer calls the mapping/business logic 232*b*, which calls the persistence logic 236. The persistence logic 236 may attempt unsuccessfully to retrieve the data from the BO database 252. Upon failing, the persistence logic 236 may call the plug-in 238*b* to retrieve the relevant BO data from the incident file 260 using the parser 270. A support user may trace the execution of the program through the persistence logic, but may not fully through the interactions with the database layer 240.

For each of the scenarios, a support user may start a debugging or tracing program to concurrently step through the execution of the transaction simulating the incident.

Figure 3:
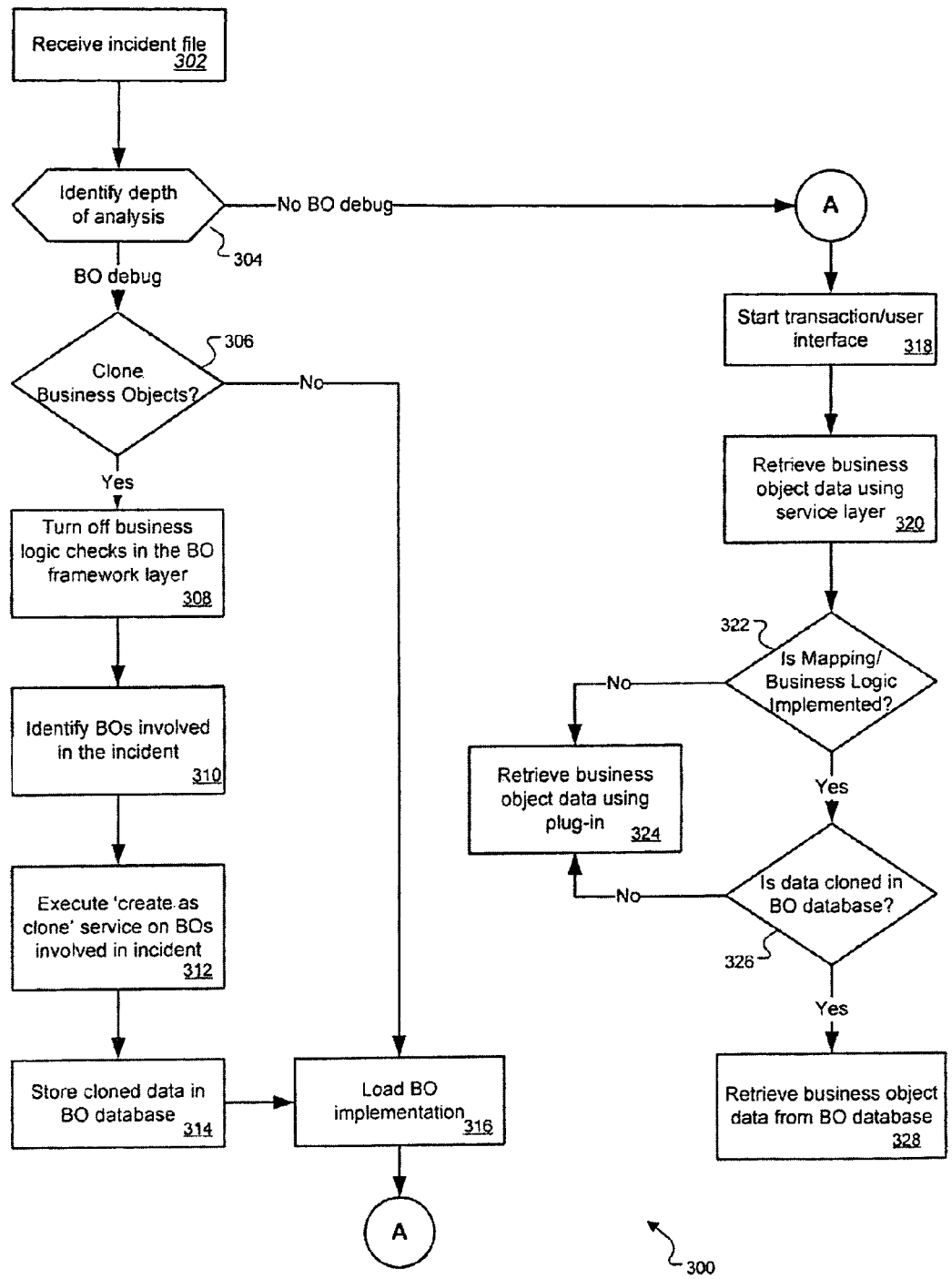
FIG. 3 illustrates an example method to create an incident simulation environment.

FIG. 3 illustrates an example method to create an incident simulation environment. In general, a support request involving an incident on a client system is received by a support application and assigned to a support user for analysis. The support user may analyze the incident using information at various layers of the architecture. Depending on the depth of analysis, business object data may or may not be cloned in the support system.

At 302, an incident file is received. The incident file contains data collected when the incident occurred. The incident file may conform to any of a variety of formats that may be parsed. For example, this file may be distributed across multiple files, packets, datagrams, and so forth. Indeed, while receiving an incident file in one self-describing format (such as XML) can be efficient, multiple formats or protocols can be used for the various information as appropriate. At 304, the depth of analysis is identified. The depth of analysis may indicate that business objects need to be debugged. This depth of analysis may be determined using any suitable criteria such as customer contract or support level, incident type, priority or critical nature, logical layer of the application associated with the incident, length of support requests queue, and so on. If not, the transaction may be started and a user interface may be created, transmitted, or otherwise presented at 318. Otherwise, at 306, it is determined whether the business objects need to be cloned. At 308, the business logic checks implemented in the BO framework layer are halted. At 310, the BOs involved in the incident are identified and, at 312, their respective "create as clone" services are executed. The "create as clone" service implemented on a business object creates a clone of that business object that can be stored and loaded in the incident simulation system, at 314 and 316.

At 318, the transaction simulating the incident and user interface is started. The user interface may be started using an OBN link. Also, a debugging program may be started to run concurrently with the transaction simulating the incident. At 320, the business object data is retrieved using the service layer. The service layer in turn calls the BO implementation layer. At 322, it is determined whether mapping/business logic is implemented. If so, the business logic code is executed. Otherwise, a plug-in or adapter parses the incident file to retrieve the BO data at 324. For example, the BO data can have the following information:

<SERVER>:<PORT>: The server and port of a support system with the same release and support package level as the customer system is used <BOTechnicalName>: Technical name of the controller object; e.g., 81A3C0924384EF0D55B5D93750CD64EAF851732

<Operation>: in the support context, the information on application is available. With this information, from the OBN parameter for the operation can be retrieved, e.g., OpenKeyUserQAF <BOSystemAlias>

<objectKey>: UUID of the controller object, perhaps available from the provider in the support studio, e.g., 00300571-b437-1ddb-b2f9-221bc6e38c91

After executing the business logic code, it is determined whether the data was cloned in the BO database. If so, the BO data is retrieved from the BO database, at 328; otherwise, the BO data is retrieved from the incident file using a plug-in or adapter, at 324.

While the present disclosure uses flowcharts and accompanying descriptions to illustrate the exemplary method 300, environment 100 contemplates using or implementing any suitable technique for performing these and other tasks. It will be understood that these methods are for illustration purposes only and that the described or similar techniques may be performed at any appropriate time, including concurrently, individually, or in combination. In addition, many of the steps in these flowcharts may take place simultaneously and/or in different orders than as shown. Moreover, environment 100 may use methods with additional steps, fewer steps, and/or different steps, so long as the method remains appropriate.

Although this disclosure has been described in terms of certain embodiments and generally associated methods, alterations and permutations of these embodiments and methods will be apparent to those skilled in the art. Accordingly, the above description of example embodiments does not define or constrain the disclosure. Other changes, substitutions, and alterations are also possible without departing from the spirit and scope of this disclosure, and such changes, substitutions, and alterations may be included within the scope of the claims included herewith.

What is claimed is:

1. An article comprising software for supporting a business application, the software comprising computer-readable instructions stored on computer-readable, non-transient media and operable when executed to:

receive error information and dynamic context information from a remote business application in response to an incident, the dynamic context information at least partially identifying a plurality of business objects associated with the incident;

clone at least one of the business objects associated with the incident;

initiate a transaction simulating at least a portion of the incident using the cloned business object; and when requested by a support user, start a debugging session running concurrently with the transaction simulating the incident, wherein the debugging session allows a user to trace code in multiple levels of a software stack associated with the transaction simulating the incident.

2. The article of claim 1 further operable to disable a business consistency check before cloning the business object.

3. The article of claim 1 further operable to copy data that were involved in the incident, wherein the data comprises at least one of: business configuration data, user data, organizational data, master data, and transactional data.

4. The article of claim 1, wherein cloning comprises invoking a cloning service implemented in one of the business objects.

5. The article of claim 1, wherein a portion of the cloned business object is stored in a local business object database.

6. The article of claim 1, wherein initiating the transaction comprises presenting a user interface that simulates the user interface of the remote business interface during the incident.

7. The article of claim 1, wherein initiating the transaction comprises retrieving a portion of the data associated with a cloned business object by executing business logic contained in the cloned business object.

8. The article of claim 1, wherein initiating the transaction comprises retrieving a portion of the data associated with a cloned business object by executing persistence logic.

9. An article comprising software for supporting a business application, the software comprising computer-readable instructions stored on computer-readable, non-transient media and operable when executed to:

receive error information and dynamic context information from a remote business application in response to an incident, the incident having a particular execution environment when the incident was created, the dynamic context information identifying a plurality of business objects associated with the incident, and the dynamic context information comprising information identifying aspects of the particular execution environment;

initiate a transaction simulating the incident;

redirect at least one service call to a plug-in, the plug-in parsing the dynamic context information to return data that simulate the particular execution environment; and when requested by a support user, execute a debugging session that runs concurrently with the transaction simulating the incident, wherein the debugging session allows a user to trace code in multiple levels of a software stack associated with the transaction simulating the incident.

10. The article of claim 9 further operable to extract data from the dynamic context information that were involved in the incident, wherein the data comprises at least one of: business configuration data, user data, organizational data, master data, and transactional data.

11. The article of claim 9 further operable to load into memory one of the business objects associated with the incident such that the business logic contained within the business objects is executed partially instead of being redirected to the plug-in.

12. The article of claim 11, wherein redirecting service calls to a plug-in comprises redirecting to plug-in-only service calls to a database layer.

13. The article of claim 9, wherein starting the transaction simulating the incident comprises starting a user interface that simulates the user interface of the remote business interface during the incident.

14. An article comprising software for supporting a business application, the software comprising computer-readable instructions stored on computer-readable, non-transient media and operable when executed to:

transmit error information and dynamic context information to support software related to an incident, the incident having a particular execution environment when the incident was created, the dynamic context information identifying a plurality of business objects associated with the incident, and the dynamic context information comprising information identifying aspects of the particular execution environment;

in response to an automated request from the support software executing a simulated transaction simulating the incident, communicate a clone of one of the associated business objects to the support software; and when requested by a support user, execute a debugging session that runs concurrently with the simulated transaction simulating the incident, wherein the debugging session allows a user to trace code in multiple levels of a software stack associated with the transaction simulating the incident.

15. The article of claim 14, the request communicated via an exposed interface in the respective business object.

16. The article of claim 14 further operable to implement a patch identified based, at least in part, on the transmitted information.

17. The article of claim 14 communicably coupled to the support software via a local plug-in.

18. The article of claim 14, the transmitted information comprising Extensible Markup Language (XML).

19. The article of claim 14 executing on a server unaffiliated with a provider of the support software.

* * * * *